United States Patent
Wu

(10) Patent No.: US 11,113,818 B1
(45) Date of Patent: Sep. 7, 2021

(54) TIMING CONTROLLER AND OPERATING METHOD THEREOF

(71) Applicant: HIMAX TECHNOLOGIES LIMITED, Tainan (TW)

(72) Inventor: Tung-Ying Wu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 78 days.

(21) Appl. No.: 16/799,861

(22) Filed: Feb. 25, 2020

(51) Int. Cl.
*G06T 7/11* (2017.01)
*G06T 7/90* (2017.01)
*G06T 7/44* (2017.01)

(52) U.S. Cl.
CPC .............. *G06T 7/11* (2017.01); *G06T 7/44* (2017.01); *G06T 7/90* (2017.01); *G06T 2207/10004* (2013.01); *G06T 2207/20021* (2013.01)

(58) Field of Classification Search
CPC combination set(s) only.
See application file for complete search history.

(56) References Cited

U.S. PATENT DOCUMENTS

| | | | |
|---|---|---|---|
| 2006/0033727 A1* | 2/2006 | Hsu | G09G 3/3648 345/204 |
| 2006/0044242 A1* | 3/2006 | Park | G09G 3/3696 345/89 |
| 2007/0188623 A1* | 8/2007 | Yamashita | G06T 5/40 348/222.1 |
| 2008/0024398 A1* | 1/2008 | Hwang | G09G 3/20 345/60 |
| 2009/0315920 A1* | 12/2009 | Sakurai | G09G 3/3648 345/690 |
| 2010/0188435 A1* | 7/2010 | Kim | G09G 3/342 345/690 |
| 2013/0321700 A1* | 12/2013 | Cote | G06T 7/90 348/453 |
| 2016/0371821 A1* | 12/2016 | Hayashi | H04N 9/04517 |

OTHER PUBLICATIONS

David Antonio-Torres,"LUT-based compensation model for OLED degradation," Jun. 18, 2012,Journal of the Society Information display ,Journal of the SID 13/5, 2005, pp. 435-440.*
Chih-Lung Lin,"LTPS-TFT Pixel Circuit to Compensate for OLED Luminance Degradation in Three-Dimensional AMOLED Display," 5, May 2012,IEEE Electron Device Letters, vol. 33, No. 5,pp. 700-701.*
Sang-moo Choi et al.,"Voltage Drop Compensation Method for Active Matrix Organic Light Emitting Diode Displays," Mar. 22, 2011,Japanese Journal of Applied Physics,50 (2011) 03CC04.*

* cited by examiner

*Primary Examiner* — Omar S Ismail
(74) *Attorney, Agent, or Firm* — CKC & Partners Co., LLC

(57) ABSTRACT

A timing controller includes an image compensator for generating compensated image data. The image compensator is configured to: divide an input image into plural image blocks; select plural pixels located at one column of the image block as plural target pixels; generate an average representative gray level of the image block according to a histogram of gray levels of the image block; input the average representative gray level into a first lookup table to obtain a first gain; input a vertical pixel position of the target pixel and the average representative gray level into a second lookup table to obtain a second gain; obtain the compensated gray level by multiplying the gray level, the first gain, and the second gain of the target pixel; and replace the gray levels with the compensated gray levels to acquire the compensated image data.

20 Claims, 5 Drawing Sheets

First Lookup Table

| Average Representative Gray Level | First Gain |
|---|---|
| 0 | 0 |
| 1 | 0.02 |
| 2 | 0.04 |
| ... | ... |
| ... | ... |
| 16 | 1 |
| ... | ... |
| ... | ... |
| 30 | 1.96 |
| 31 | 2 |

FIG. 4

Second Lookup Table

| Average Representative Gray Level \ Vertical Pixel Position | 1 | ... | ... | ... | 1080 | ... | ... | ... | 2160 |
|---|---|---|---|---|---|---|---|---|---|
| 0 | 0 | 0.00333 | 0.00667 | 0.01 | 0.0133 | 0.01667 | 0.02 |
| ... | ... | ... | ... | ... | ... | ... | ... |
| 4 | 0.25 | 0.375 | 0.5 | 0.625 | 0.75 | 0.875 | 1 |
| ... | ... | ... | ... | ... | ... | ... | ... |
| 16 | 0.5 | 0.66667 | 0.83333 | 1 | 1.16667 | 1.33333 | 1.5 |
| ... | ... | ... | ... | ... | ... | ... | ... |
| 24 | 0.75 | 0.91667 | 1.08333 | 1.25 | 1.41667 | 1.58333 | 1.75 |
| ... | ... | ... | ... | ... | ... | ... | ... |
| 31 | 1 | 1.16667 | 1.33333 | 1.5 | 1.66667 | 1.8333 | 2 |

Second Gain

FIG. 5

TIMING CONTROLLER AND OPERATING METHOD THEREOF

BACKGROUND

Field of Invention

The present invention relates to a timing controller and an operating method of the timing controller. More particularly, the present invention relates to the operating method of the timing controller of an organic light-emitting diode (OLED) display device, and the operating method is used for improving a brightness degradation induced by IR-Drop phenomenon.

Description of Related Art

The organic light-emitting diode (OLED) display possesses many outstanding properties of self-illumination, low driving voltage, high luminescence efficiency, short response time, high clarity and contrast, near 180° view angle, wide range of working temperature, applicability of flexible display and large scale full color display. The OLED display is considered as the most potential display device.

With the progress of time and technology, the large scale, high resolution OLED display has been gradually developed. Correspondingly, the large scale OLED display requires panel of larger scale and pixels of more amounts. The length of the conductive line becomes longer and the electrical resistance becomes larger. Unavoidably, the power supply voltage input to the pixel close to the power supply is relatively high, and the power supply voltage input to the pixel far from the power supply is relatively low, namely a so-called "voltage drop" (IR-Drop) phenomenon appears. This phenomenon causes that the display brightness of the entire panel is non-uniform (also called the brightness degradation).

SUMMARY

The present invention provides a timing controller including a receiver, an image compensator, and a transmitter. The receiver is configured to receive image data of an input image, in which the input image includes plural of pixels. The image compensator is configured to generate compensated image data according to the image date. The transmitter is configured to output the compensated image data such that a display device including the timing controller displays an image according to the compensated image data. The image compensator is further configured to: divide the input image into plural image blocks along a horizontal direction; select the pixels located at one of columns of each of the image blocks as plural target pixels; obtain each of gray levels of the pixels; generate an average representative gray level of each of the image blocks according to a histogram of the gray levels of each of the image blocks; input the average representative gray level of each of the image blocks into a first lookup table to obtain a first gain of corresponding image block; input a vertical pixel position of each of the target pixels of each of the image blocks and the average representative gray level of the corresponding image blocks into a second lookup table to obtain a second gain of the corresponding target pixel of the corresponding image block; obtain each of compensated gray levels of the target pixels of each of the image blocks by multiplying the gray level of the corresponding target pixel, the first gain of the corresponding image block, and the second gain of the corresponding target pixel; and replace the gray levels of the target pixels with the compensated gray levels of the corresponding target pixels, respectively, so as to acquire the compensated image data.

In accordance with one or more embodiments of the invention, the histogram of the gray levels includes plural histogram bins corresponding to different gray level ranges. A height of one of the histogram bins represents a total pixel number of the pixels within the corresponding gray level range.

In accordance with one or more embodiments of the invention, the pixels of one of the image blocks are arranged in rows and columns of the one of the image blocks. The target pixels of the one of the image blocks are the pixels located at a central column of the one of the image blocks.

In accordance with one or more embodiments of the invention, the average representative gray level of one of the image blocks corresponds to an average of the gray levels of the pixels of the one of the image block.

In accordance with one or more embodiments of the invention, the histogram bins respectively correspond to plural weight values. The image compensator is further configured to: update the total pixel number of one of the histogram bins by multiplying the total pixel number of the one of the histogram bins and the weight value of the one of the histogram bins when generating the average representative gray level of each of the image blocks.

In accordance with one or more embodiments of the invention, the image compensator is further configured to: perform a linear interpolation calculation to obtain the compensated gray levels of the pixels except for the target pixels; and replace the gray levels of the pixels except for the target pixels with the compensated gray levels of the corresponding pixels except for the target pixels respectively, so as to acquire the compensated image data.

In accordance with one or more embodiments of the invention, the linear interpolation calculation includes: determining two adjacent target pixels which are horizontally closest to one of the pixels except for the target pixels; and calculating the compensated gray level of the one of the pixels except for the target pixels by linear interpolating the compensated gray levels of the determined target pixels.

In accordance with one or more embodiments of the invention, the pixels of one of the image blocks are arranged in rows and columns of the one of the image blocks. The target pixels of a first of the image blocks are the pixels located at a first column of the first of the image blocks. The target pixels of a last of the image block are the pixels located at a last column of the last of the image blocks.

In accordance with one or more embodiments of the invention, the weight value of one of the histogram bins corresponding to a lower gray level range is smaller than the weight value of another of the histogram bins corresponding to a higher gray level range.

In accordance with one or more embodiments of the invention, the second gain of one of the target pixels located at a higher vertical pixel position is smaller than the second gain of another of the target pixels corresponding to a lower vertical pixel position.

The present invention further provides an operating method of a timing controller including: providing image data of an input image including plural pixels; dividing the input image into plural image blocks along a horizontal direction; selecting the pixels located at one of columns of each of the image blocks as plural target pixels; obtaining each of gray levels of the pixels; generating an average representative gray level of each of the image blocks according to a histogram of the gray levels of each of the image blocks; inputting the average representative gray level of each of the image blocks into a first lookup table to obtain a first gain of corresponding image block; inputting a vertical pixel position of each of the target pixels of each of the image blocks and the average representative gray level of the corresponding image blocks into a second lookup table to obtain a second gain of the corresponding target pixel of the corresponding image block; obtaining each of compensated gray levels of the target pixels of each of the image blocks by multiplying the gray level of the corresponding target pixel, the first gain of the corresponding image block, and the second gain of the corresponding target pixel; replacing the gray levels of the target pixels with the compensated gray levels of the corresponding target pixels, respectively, so as to acquire compensated image data; and displaying an image via a display device including the timing controller according to the compensated image data.

In accordance with one or more embodiments of the invention, the histogram of the gray levels includes plural histogram bins corresponding to different gray level ranges. A height of one of the histogram bins represents a total pixel number of the pixels within the corresponding gray level range.

In accordance with one or more embodiments of the invention, the pixels of one of the image blocks are arranged in rows and columns of the one of the image blocks. The target pixels of the one of the image blocks are the pixels located at a central column of the one of the image blocks.

In accordance with one or more embodiments of the invention, the average representative gray level of one of the image blocks corresponds to an average of the gray levels of the pixels of the one of the image block.

In accordance with one or more embodiments of the invention, the histogram bins respectively correspond to plural weight values. The operating method further includes: update the total pixel number of one of the histogram bins by multiplying the total pixel number of the one of the histogram bins and the weight value of the one of the histogram bins when generating the average representative gray level of each of the image blocks.

In accordance with one or more embodiments of the invention, the operating method further includes: perform a linear interpolation calculation to obtain the compensated gray levels of the pixels except for the target pixels; and replace the gray levels of the pixels except for the target pixels with the compensated gray levels of the corresponding pixels except for the target pixels respectively, so as to acquire the compensated image data.

In accordance with one or more embodiments of the invention, the linear interpolation calculation includes: determining two adjacent target pixels which are horizontally closest to one of the pixels except for the target pixels; and calculating the compensated gray level of the one of the pixels except for the target pixels by linear interpolating the compensated gray levels of the determined target pixels.

In accordance with one or more embodiments of the invention, the pixels of one of the image blocks are arranged in rows and columns of the one of the image blocks. The target pixels of a first of the image blocks are the pixels located at a first column of the first of the image blocks. The target pixels of a last of the image block are the pixels located at a last column of the last of the image blocks.

In accordance with one or more embodiments of the invention, the weight value of one of the histogram bins corresponding to a lower gray level range is smaller than the weight value of another of the histogram bins corresponding to a higher gray level range.

In accordance with one or more embodiments of the invention, the second gain of one of the target pixels located at a higher vertical pixel position is smaller than the second gain of another of the target pixels corresponding to a lower vertical pixel position.

BRIEF DESCRIPTION OF THE DRAWINGS

The invention can be more fully understood by reading the following detailed description of the embodiment, with reference made to the accompanying drawings as follows:

FIG. 4 shows a first lookup table according to some embodiments of the present invention.

FIG. 5 shows a second lookup table according to some embodiments of the present invention.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identify units or data described by the same terminology, but are not referred to particular order or sequence.

Figure 1:
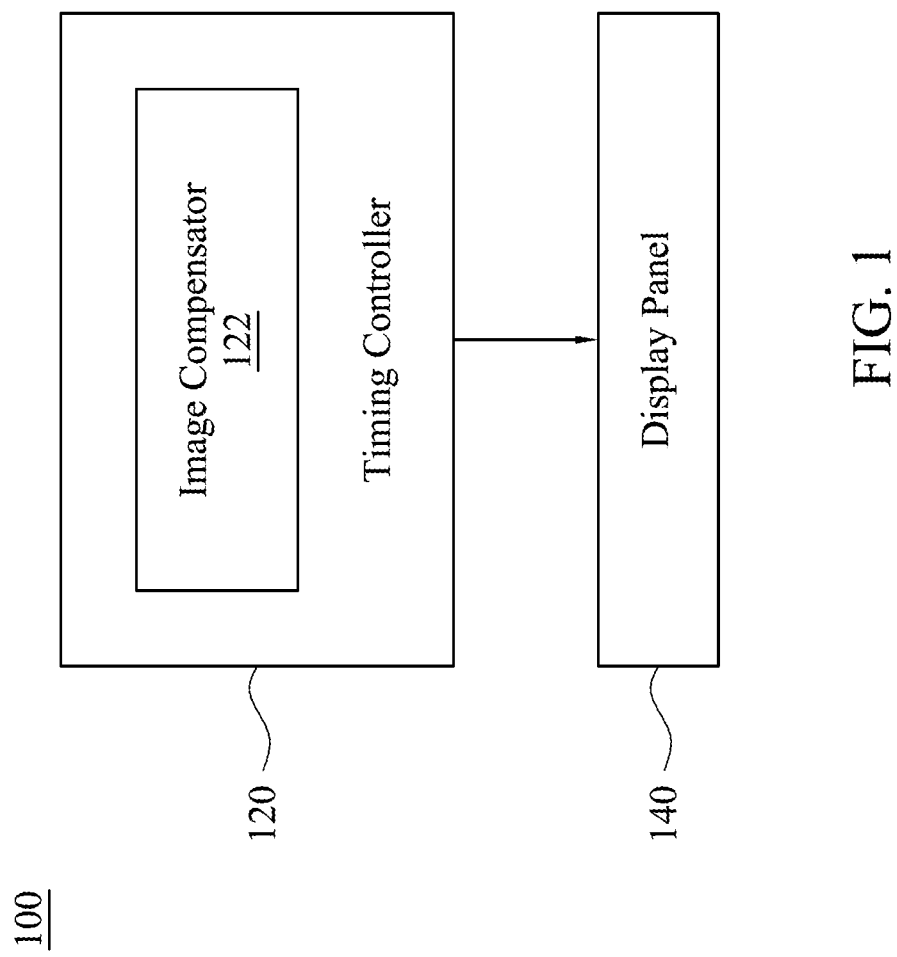
FIG. 1 illustrates a block diagram of an organic light-emitting diode (OLED) display device according to some embodiments of the present invention.

FIG. 1 illustrates a block diagram of an organic light-emitting diode (OLED) display device 100 according to some embodiments of the present invention. The OLED display device 100 includes a timing controller (T-CON) 120 and a display panel 140 including plural pixels. The timing controller 120 includes an image compensator 122.

Figure 2:
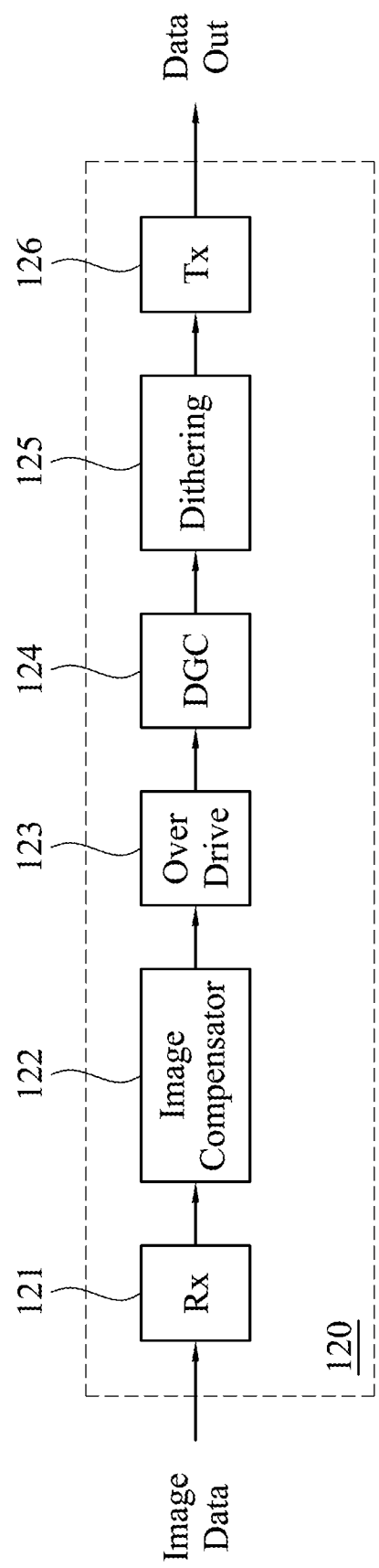
FIG. 2 illustrates a block diagram of a timing controller of the OLED display device according to some embodiments of the present invention.

FIG. 2 illustrates a block diagram of the timing controller 120 of the OLED display device 100 according to some embodiments of the present invention. The timing controller 120 receives image data of an input image and correspondingly transmits corresponding voltage signal (shown as "Data Out" in FIG. 2) for driving the display panel 140, in which the input image has plural gray levels respectively corresponding to the pixels of the display panel 140. As shown in FIG. 2, the timing controller 120 includes a receiver (Rx) block 121, the image compensator 122, an over drive (OD) block 123, a digital gamma correction (DGC) block 124, a dithering block 125, and a transmitter (Tx) block 126. The receiver block 121 is configured to receive the image data of the input image. The image compensator 122 is configured to generate compensated image data according to the image data of the input image. The transmitter block 126 is configured to output the compensated image data, such that the timing controller 120 transmits voltage signal corresponding to the compensated image data. The display panel 140 includes a gate driver and a source driver for receiving the voltage signal from the timing controller 120 and the display panel 140 displays an image according to the voltage signal corresponding to the compensated image data. Specifically, the compensated image data generated by the image compensator 122 is used for compensating the brightness degradation induced by IR-Drop phenomenon regarding to the OLED display device 100, and the calculation of the compensated image data will be discussed hereinafter. The over drive block 123 is used for reducing motion artifacts of the OLED display device 100. The digital gamma correction block 124 is used for correcting the image data. The dithering block 125 is used for increasing the smoothness of the image displayed by the display panel 140.

Figure 3:
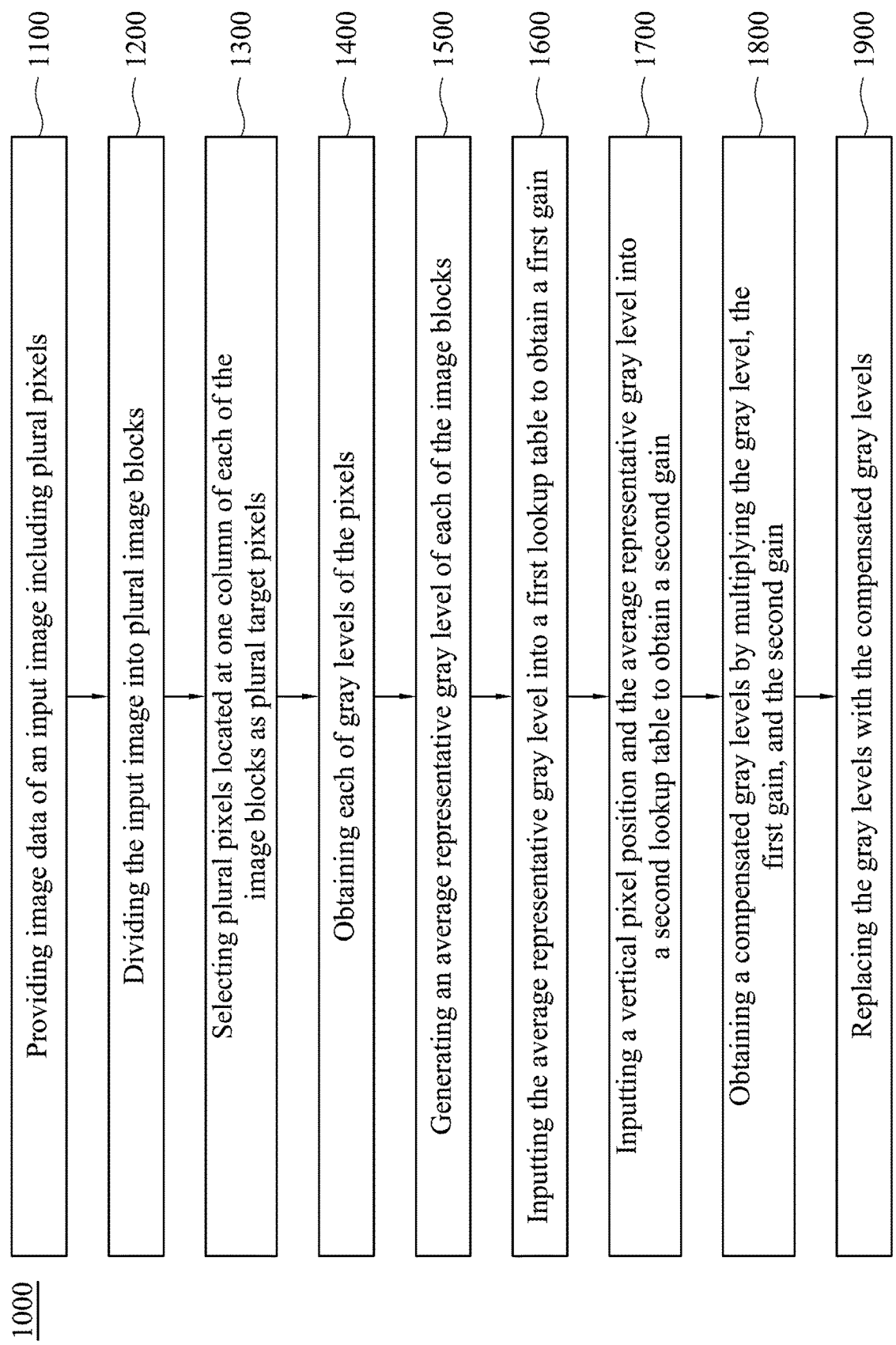
FIG. 3 illustrates a flow chart of an operating method of the timing controller of the OLED display device according to some embodiments of the present invention.

Please refer to FIG. 3, and refer to FIG. 1 as well. FIG. 3 illustrates a flow chart of an operating method 1000 of the OLED display device 100 according to some embodiments of the present invention. In step 1100, the image data of the input image including plural pixels is provided and then received by the image compensator 122 of the OLED display device 100. Next, in step 1200, the image compensator 122 is configured to divide the input image into plural image blocks along a horizontal direction. The pixels of one of the image blocks are arranged in rows and columns of the one of the image blocks. In some embodiments of the present invention, the display panel 140 is a 4K UHD (Ultra High Definition) RGB color panel with 3840×2160 pixels and the input image is divided into 16 image blocks along the horizontal direction, that is, each of image blocks has 240×2160 gray levels respectively corresponding to the 240*2160 pixels, however, the present invention is not limited thereto.

In step 1300, the image compensator 122 is configured to select the pixels located at one of columns of one of the image blocks as plural target pixels of the one of the image blocks. In some embodiments of the present invention, the pixels located at a central column of one of the image blocks are selected as the target pixels of the one of the image blocks. In another embodiment of the present invention, the pixels located at a first column of a first of the image blocks are selected as the target pixels of the first of the image blocks, and the pixels located at a last column of a last of the image blocks are selected as the target pixels of the last of the image blocks. In step 1400, the image compensator 122 is configured to obtain each of the gray levels of the pixels of the input image.

In step 1500, the image compensator 122 is configured to generate an average representative gray level of each of the image blocks according to a histogram of the gray levels of the pixels of each of the image blocks. In some embodiments of the present invention, the histogram of the gray levels of the pixels of each of the image blocks includes plural histogram bins corresponding to different gray level ranges, and a height of one of the histogram bins represents a total pixel number of the pixels within the corresponding gray level range. For example, the histogram of the gray levels of the pixels of each of the image blocks includes 32 histogram bins corresponding to 32 gray level ranges (i.e., 0~7 gray level, 8~15 gray level, . . . , 240~247 gray level, 248~255 gray level). It is noted that the present invention applies spatial down sampling to reduce data size of the transmitted signal, such that the histogram of the gray levels of the pixels of each of the image blocks includes 32 histogram bins, but the present invention is not limited thereto. Further, a sequential number of one of the gray level ranges is defined as a representative gray level of the one of the gray level ranges, for example, the representative gray level of 0~7 gray level is 0 (referred as level_0 herein), the representative gray level of 8~15 gray level is 1 (referred as level_1 herein), the representative gray level of 240~247 gray level is 30 (referred as level_30 herein), and the representative gray level of 248~255 gray level is 31 (referred as level_31 herein). According to the height of each of the histogram bins, a total pixel number (also called "count" hereinafter) of the pixels of each of the image blocks within the corresponding gray level range is obtained. In some embodiments of the present invention, the total pixel number of the pixels of one of the image blocks within 0~7 gray level is referred as count_0 herein, the total pixel number of the pixels of the one of the image blocks within 8~15 gray level is referred as count_1 herein, the total pixel number of the pixels of the one of the image blocks within 240~247 gray level is referred as count_30 herein, and the total pixel number of the pixels of the one of the image blocks within 248~255 gray level is referred as count_31 herein. The average representative gray level of each of the image blocks is calculated by a following equation: the average representative gray level=(count_0×level_0+count_1×level_1+ . . . +count_30×level_30+count_31×level_31)/32. Therefore, it could be understood that the average representative gray level of one of the image blocks corresponds to an average of the gray levels of the pixels of the one of the image block.

For example, when the total pixel number of the pixels of one of the image blocks within 0~7 gray level range is 30, the total pixel number of the pixels of the one of the image blocks within 8~15 gray level range is 60, the total pixel number of the pixels of the one of the image blocks within 240~247 gray level range is 20, and the total pixel number of the pixels of the one of the image blocks within 248~255 gray level range is 10, then the average representative gray level of the one of the image blocks is calculated by the following equation: the average representative gray level= [(30×0+60×1+ . . . +20×30+10×31)/32].

In some other embodiments of the present invention, the histogram bins respectively correspond to plural weight values, and thus during step 1500, the image compensator 122 is further configured to update the total pixel number of one of the histogram bins by multiplying the total pixel number of the one of the histogram bins and the weight value of the one of the histogram bins when generating the average representative gray level of each of the image blocks, so as to obtain a updated average representative gray level (also called a weighted average representative gray level hereinafter). In some embodiments of the present invention, the weight value of the histogram bin corresponding to 0~7 gray level is referred as weight_0 herein, the weight value of the histogram bin corresponding to 8~15 gray level is referred as weight_1 herein, the weight value of the histogram bin corresponding to 240~247 gray level is referred as weight_30 herein, and the weight value of the histogram bin corresponding to 248~255 gray level is referred as weight_31 herein. In such case, the weighted average representative gray level of each of the image blocks is calculated by the following equation: the weighted average representative gray level=[(weight_0×count_0× level_0+weight_1×count_1×level_1+ . . . +weight_30× count_30×level_30+weight_31×count_31×level_31)/32].

In some other embodiments of the present invention, the weight value of one of the histogram bins corresponding to a lower gray level range is smaller than the weight value of another of the histogram bins corresponding to a higher gray level range. For example, the weight value of the histogram bin corresponding to 0~7 gray level is 0.01, the weight value of the histogram bin corresponding to 8~15 gray level is 0.015, the weight value of the histogram bin corresponding to 240~247 gray level is 0.4, and the weight value of the histogram bin corresponding to 248~255 gray level is 0.5. The reason of the aforementioned distribution of the weight values is that the brightness degradation induced by IR-Drop phenomenon is relatively obvious for the brighter pixel (corresponding to larger gray level).

In step 1600, the image compensator 122 is configured to input the average representative gray level of each of the image blocks into a first lookup table to obtain a first gain of corresponding image block. FIG. 4 shows the first lookup table according to some embodiments of the present invention. In some embodiments of the present invention, as shown in FIG. 4, the first gain of one of the image blocks corresponding to the smaller average representative gray level is smaller than the first gain of another of the image blocks corresponding to the larger average representative gray level. The reason of the aforementioned distribution of the first gains is that the brightness degradation induced by IR-Drop phenomenon is relatively obvious for the brighter pixel (corresponding to the larger average representative gray level).

In step 1700, the image compensator 122 is configured to input a vertical pixel position of each of the target pixels of each of the image blocks and the average representative gray level of the corresponding image blocks into a second lookup table to obtain a second gain of the corresponding target pixel of the corresponding image block. FIG. 5 shows the second lookup table according to some embodiments of the present invention. In some embodiments of the present invention, each of image blocks has 240×2160 gray levels respectively corresponding to the 240*2160 pixels, and thus the vertical pixel position of one of the target pixels is within 1 to 2160. In some embodiments of the present invention, as shown in FIG. 5, the second gain of one of the target pixels located at a higher vertical pixel position is smaller than the second gain of another of the target pixels corresponding to a lower vertical pixel position. The reason of the aforementioned distribution of the second gains is that the brightness degradation induced by IR-Drop phenomenon is relatively obvious for the pixel far from a supply power (also called "ELVDD") located at the top of the display panel 140 (corresponding to the pixel located at a lower vertical pixel position).

In step 1800, the image compensator 122 is configured to obtain each of compensated gray levels of the target pixels of each of the image blocks by multiplying the gray level of the corresponding target pixel, the first gain of the corresponding image block, and the second gain of the corresponding target pixel. In some embodiments of the present invention, the image compensator 122 is further configured to perform a linear interpolation calculation to obtain the compensated gray levels of the pixels except for the target pixels. The linear interpolation calculation includes: determining two adjacent target pixels which are horizontally closest to one of the pixels except for the target pixels; and calculating the compensated gray level of the one of the pixels except for the target pixels by linear interpolating the compensated gray levels of the determined target pixels. Specifically, the compensated gray levels of the pixels except for the target pixels are calculated by linear interpolating the compensated gray levels of two horizontally closest target pixels.

In step 1900, the image compensator 122 is configured to replace the gray levels of the target pixels with the compensated gray levels of the corresponding target pixels, respectively, so as to acquire the compensated image data. In some embodiments of the present invention, the image compensator 122 is further configured to replace the gray levels of the pixels except for the target pixels with the compensated gray levels of the corresponding pixels except for the target pixels respectively, so as to acquire the compensated image data.

From the above description, a timing controller of an OLED display device and an operating method of the timing controller of an OLED display device are provided. An image compensator of the timing controller of the OLED display of the present invention is configured to generate the compensated image data for compensating a brightness degradation induced by IR-Drop phenomenon.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A timing controller, comprising:
  a receiver configured to receive image data of an input image, wherein the input image comprises a plurality of pixels;
  an image compensator configured to generate compensated image data according to the image data; and
  a transmitter configured to output the compensated image data such that a display device comprising the timing controller displays an image according to the compensated image data;
  wherein the image compensator is further configured to:
    divide the input image into a plurality of image blocks along a horizontal direction;
    select the pixels located at one of columns of each of the image blocks as a plurality of target pixels;
    obtain each of gray levels of the pixels;
    generate an average representative gray level of each of the image blocks according to a histogram of the gray levels of each of the image blocks;
    input the average representative gray level of each of the image blocks into a first lookup table to obtain a first gain of corresponding image block;
    input a vertical pixel position of each of the target pixels of each of the image blocks and the average representative gray level of the corresponding image blocks into a second lookup table to obtain a second gain of the corresponding target pixel of the corresponding image block;
    obtain each of compensated gray levels of the target pixels of each of the image blocks by multiplying the gray level of the corresponding target pixel, the first gain of the corresponding image block, and the second gain of the corresponding target pixel; and
    replace the gray levels of the target pixels with the compensated gray levels of the corresponding target pixels, respectively, so as to acquire the compensated image data.

2. The timing controller of claim 1,
wherein the histogram of the gray levels comprises a plurality of histogram bins corresponding to different gray level ranges;
wherein a height of one of the histogram bins represents a total pixel number of the pixels within the corresponding gray level range.

3. The timing controller of claim 1,
wherein the pixels of one of the image blocks are arranged in rows and columns of the one of the image blocks;
wherein the target pixels of the one of the image blocks are the pixels located at a central column of the one of the image blocks.

4. The timing controller of claim 1, wherein the average representative gray level of one of the image blocks corresponds to an average of the gray levels of the pixels of the one of the image block.

5. The timing controller of claim 2, wherein the histogram bins respectively correspond to a plurality of weight values, wherein the image compensator is further configured to:
update the total pixel number of one of the histogram bins by multiplying the total pixel number of the one of the histogram bins and the weight value of the one of the histogram bins when generating the average representative gray level of each of the image blocks.

6. The timing controller of claim 1, wherein the image compensator is further configured to:
perform a linear interpolation calculation to obtain the compensated gray levels of the pixels except for the target pixels; and
replace the gray levels of the pixels except for the target pixels with the compensated gray levels of the corresponding pixels except for the target pixels respectively, so as to acquire the compensated image data.

7. The timing controller of claim 6, wherein the linear interpolation calculation comprises:
determining two adjacent target pixels which are horizontally closest to one of the pixels except for the target pixels; and
calculating the compensated gray level of the one of the pixels except for the target pixels by linear interpolating the compensated gray levels of the determined target pixels.

8. The timing controller of claim 1,
wherein the pixels of one of the image blocks are arranged in rows and columns of the one of the image blocks;
wherein the target pixels of a first of the image blocks are the pixels located at a first column of the first of the image blocks;
wherein the target pixels of a last of the image block are the pixels located at a last column of the last of the image blocks.

9. The timing controller of claim 5, wherein the weight value of one of the histogram bins corresponding to a lower gray level range is smaller than the weight value of another of the histogram bins corresponding to a higher gray level range.

10. The timing controller of claim 1, wherein the second gain of one of the target pixels located at a higher vertical pixel position is smaller than the second gain of another of the target pixels corresponding to a lower vertical pixel position.

11. An operating method of a timing controller, comprising:
providing image data of an input image comprising a plurality of pixels;
dividing the input image into a plurality of image blocks along a horizontal direction;
selecting the pixels located at one of columns of each of the image blocks as a plurality of target pixels;
obtaining each of gray levels of the pixels;
generating an average representative gray level of each of the image blocks according to a histogram of the gray levels of each of the image blocks;
inputting the average representative gray level of each of the image blocks into a first lookup table to obtain a first gain of corresponding image block;
inputting a vertical pixel position of each of the target pixels of each of the image blocks and the average representative gray level of the corresponding image blocks into a second lookup table to obtain a second gain of the corresponding target pixel of the corresponding image block;
obtaining each of compensated gray levels of the target pixels of each of the image blocks by multiplying the gray level of the corresponding target pixel, the first gain of the corresponding image block, and the second gain of the corresponding target pixel;
replacing the gray levels of the target pixels with the compensated gray levels of the corresponding target pixels, respectively, so as to acquire compensated image data; and
displaying an image via a display device comprising the timing controller according to the compensated image data.

12. The operating method of the timing controller of claim 11,
wherein the histogram of the gray levels comprises a plurality of histogram bins corresponding to different gray level ranges;
wherein a height of one of the histogram bins represents a total pixel number of the pixels within the corresponding gray level range.

13. The operating method of the timing controller of claim 11,
wherein the pixels of one of the image blocks are arranged in rows and columns of the one of the image blocks;
wherein the target pixels of the one of the image blocks are the pixels located at a central column of the one of the image blocks.

14. The operating method of the timing controller of claim 11, wherein the average representative gray level of one of the image blocks corresponds to an average of the gray levels of the pixels of the one of the image block.

15. The operating method of the timing controller of claim 12, wherein the histogram bins respectively correspond to a plurality of weight values, wherein the operating method further comprises:
updating the total pixel number of one of the histogram bins by multiplying the total pixel number of the one of the histogram bins and the weight value of the one of the histogram bins when generating the average representative gray level of each of the image blocks.

16. The operating method of the timing controller of claim 11, further comprising:
performing a linear interpolation calculation to obtain the compensated gray levels of the pixels except for the target pixels; and
replacing the gray levels of the pixels except for the target pixels with the compensated gray levels of the corresponding pixels except for the target pixels respectively, so as to acquire the compensated image data.

17. The operating method of the timing controller of claim 16, wherein the linear interpolation calculation comprises:
- determining two adjacent target pixels which are horizontally closest to one of the pixels except for the target pixels; and
- calculating the compensated gray level of the one of the pixels except for the target pixels by linear interpolating the compensated gray levels of the determined target pixels.

18. The operating method of the timing controller of claim 11,
- wherein the pixels of one of the image blocks are arranged in rows and columns of the one of the image blocks;
- wherein the target pixels of a first of the image blocks are the pixels located at a first column of the first of the image blocks;
- wherein the target pixels of a last of the image block are the pixels located at a last column of the last of the image blocks.

19. The operating method of the timing controller of claim 15, wherein the weight value of one of the histogram bins corresponding to a lower gray level range is smaller than the weight value of another of the histogram bins corresponding to a higher gray level range.

20. The operating method of the timing controller of claim 11, wherein the second gain of one of the target pixels located at a higher vertical pixel position is smaller than the second gain of another of the target pixels corresponding to a lower vertical pixel position.

* * * * *